United States Patent [19]

Kanai

[11] Patent Number: 5,339,410
[45] Date of Patent: Aug. 16, 1994

[54] METHOD OF BIDIRECTIONAL RECALCULATION

[75] Inventor: Naoki Kanai, Tokyo, Japan

[73] Assignee: International Business Machines Corporation, Armonk, N.Y.

[21] Appl. No.: 912,048

[22] Filed: Jul. 9, 1992

Related U.S. Application Data

[63] Continuation of Ser. No. 398,123, Aug. 23, 1989, abandoned.

[30] Foreign Application Priority Data

Sep. 9, 1988 [JP] Japan ............... 63-224449

[51] Int. Cl.⁵ .............. G06F 15/00; G06F 15/30; G06F 15/32
[52] U.S. Cl. .............. 395/600; 364/DIG. 1; 364/225.1; 364/225.2; 364/408

[58] Field of Search .............. 395/600; 364/408, 513

[56] References Cited

U.S. PATENT DOCUMENTS

| | | | |
|---|---|---|---|
| 4,866,634 | 9/1989 | Reboh et al. | 364/513 |
| 4,989,141 | 1/1991 | Lyons et al. | 364/408 |
| 5,055,998 | 10/1991 | Wright et al. | 364/200 |

*Primary Examiner*—Gareth D. Shaw
*Assistant Examiner*—A. Katbab
*Attorney, Agent, or Firm*—David A. Mims, Jr.

[57] ABSTRACT

A recalculation function operates in both directions on a spreadsheet. The function is activated when a user directly changes any cell value. The other cell values are automatically recalculated resulting in easier and smoother operation of the spreadsheet.

5 Claims, 20 Drawing Sheets

RELATION NAME : f
RELATION FORMULA : Y = X1 + X2
PROPAGATION CONSTRAINT CELL : X1

CELL WITH ITS VALUE CHANGED

CELL WITH ITS VALUE CHANGED

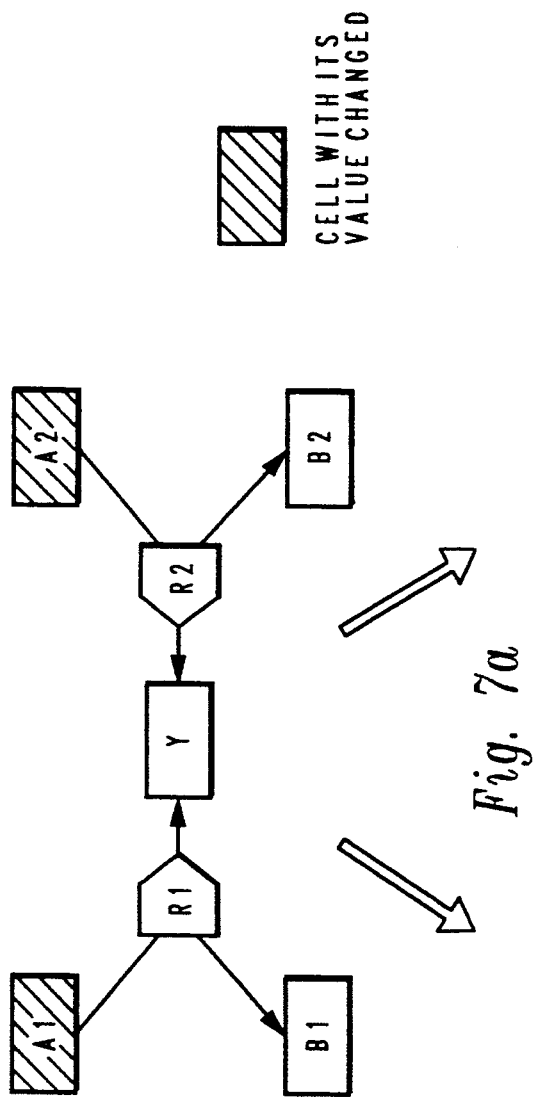
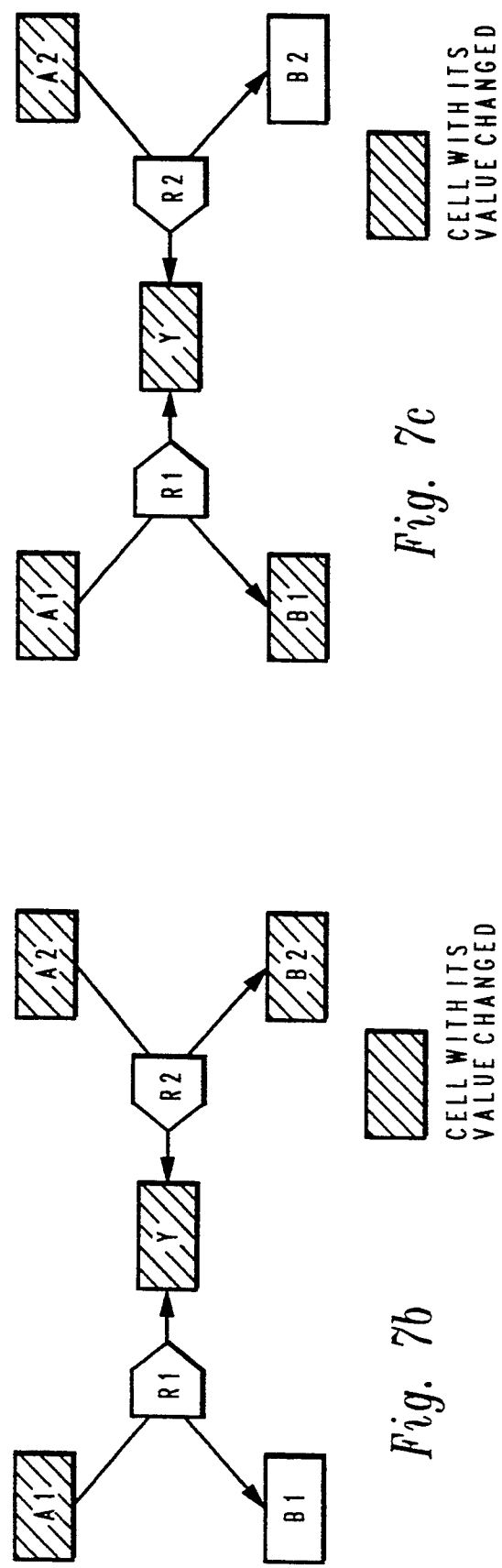
Fig. 7a
Fig. 7b
Fig. 7c

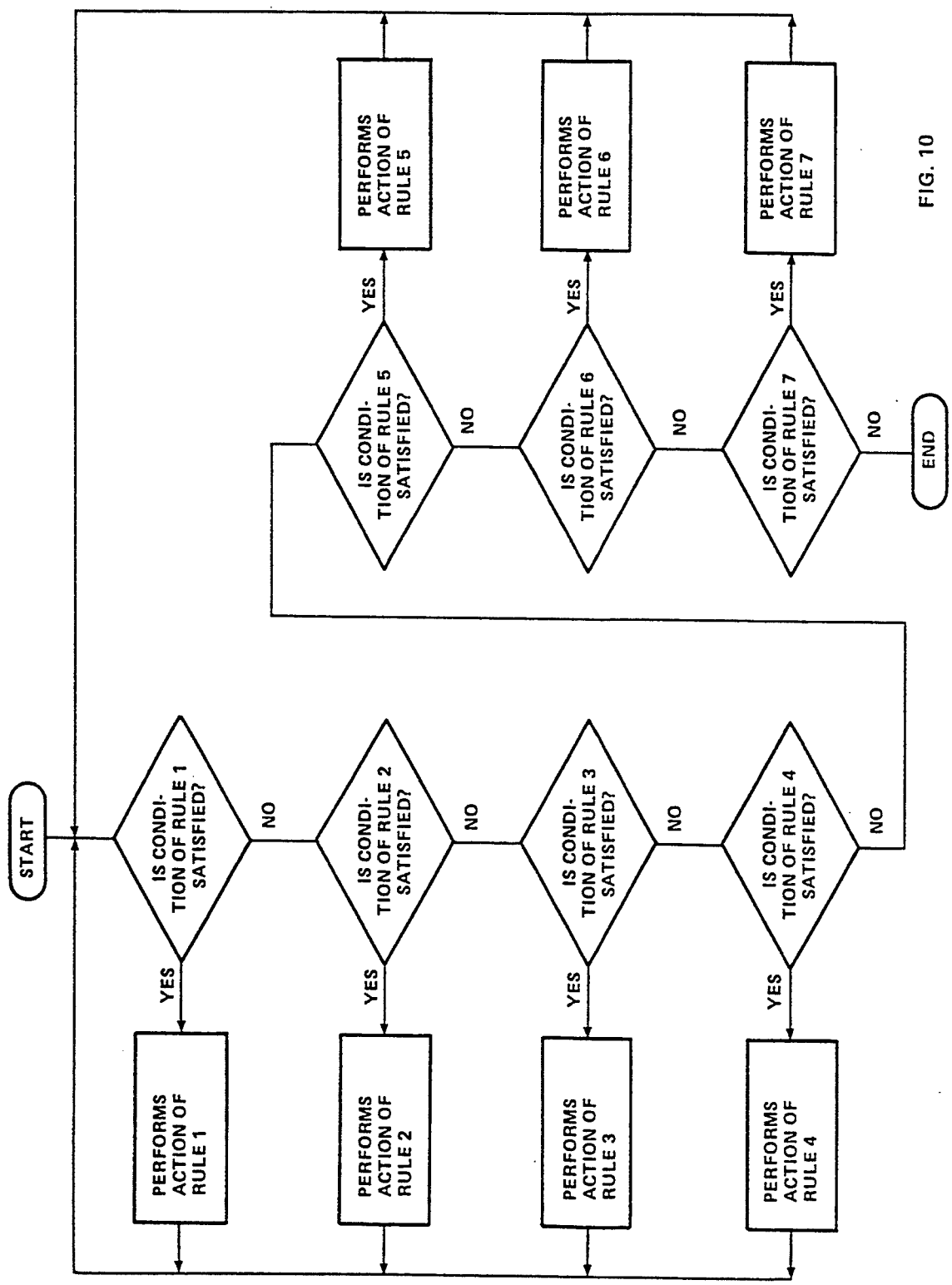

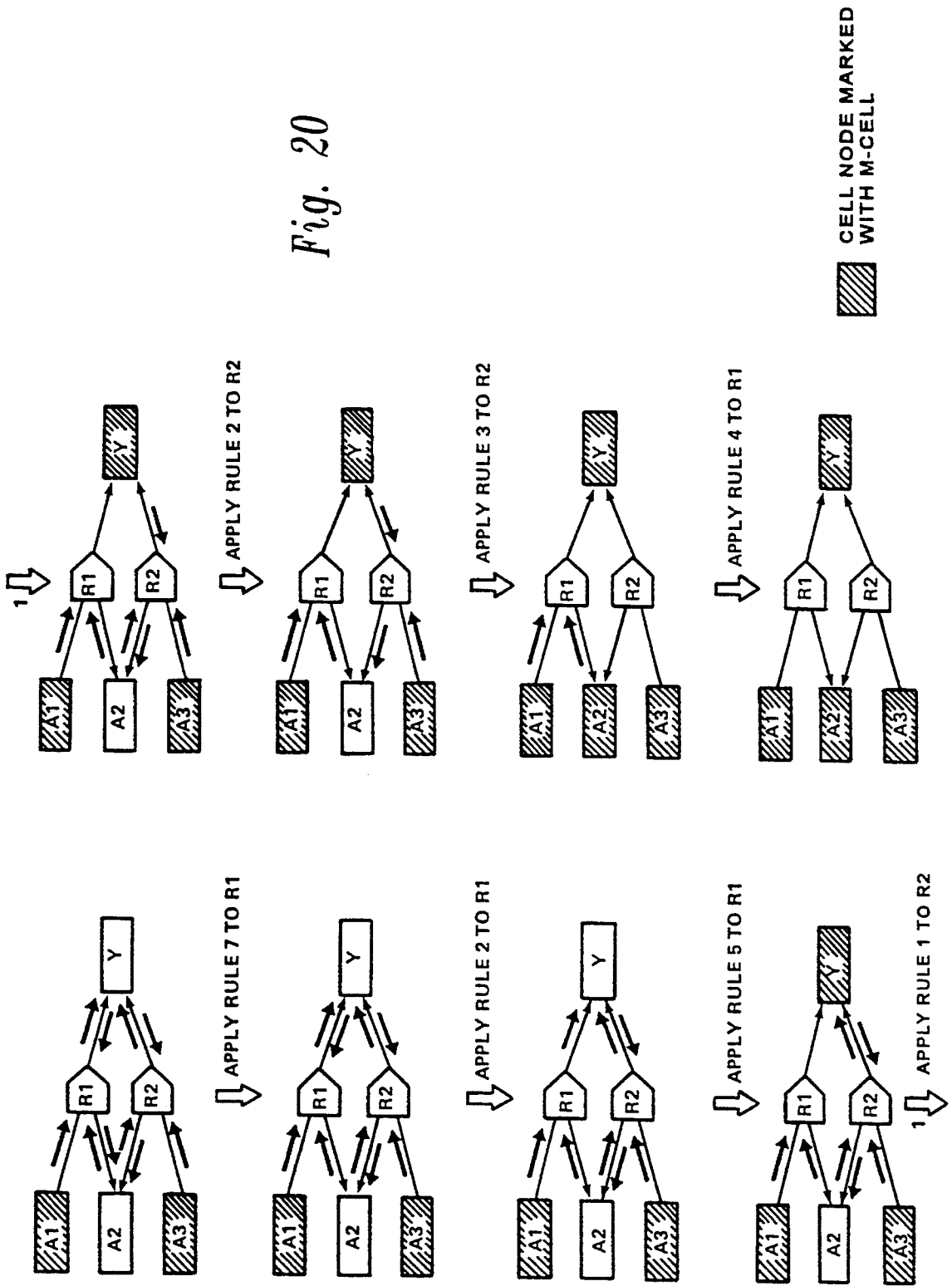

|   | A | B | C | D |
|---|---|---|---|---|
| 1 |  | LOAN AMOUNT | REPAYMENT AMOUNT FOR TEN THOUSAND YEN | REPAYMENT AMOUNT |
| 2 | MONTHLY REPAYMENT AMOUNT | 0 | 60 | 0 |
| 3 | REPAYMENT AMOUNT FROM EACH BONUS | 0 | 500 | 0 |
| 4 | TOTAL AMOUNT | 0 |  |  |
|   |   |   |   |   |

RELATION DIFINITION

(1) B2 = B4 − B3    PROPAGATION CONSTRAINT: B3

(2) D2 = C2 × B2/1000    PROPAGATION CONSTRAINT: B2

(3) D3 = C3 × B3/1000    PROPAGATION CONSTRAINT: B3

FIG. 21

|   | A | B | C | D |
|---|---|---|---|---|
| 1 |  | LOAN AMOUNT | REPAYMENT AMOUNT FOR TEN THOUSAND YEN | REPAYMENT AMOUNT |
| 2 | MONTHLY REPAYMENT AMOUNT | 30000000 | 60 | 180000 |
| 3 | REPAYMENT AMOUNT FROM EACH BONUS | 0 | 500 | 0 |
| 4 | TOTAL AMOUNT | 30000000 |  |  |
|   |   |   |   |   |

FIG. 22

|   | A | B | C | D |
|---|---|---|---|---|
| 1 |  | LOAN AMOUNT | REPAYMENT AMOUNT FOR TEN THOUSAND YEN |  |
| 2 | MONTHLY REPAYMENT AMOUNT | 20000000 | 60 | 120000 |
| 3 | REPAYMENT AMOUNT FROM EACH BONUS | 10000000 | 500 | 500000 |
| 4 | TOTAL AMOUNT | 30000000 |  |  |
|   |   |   |   |   |

FIG. 23

|   | A | B | C | D |
|---|---|---|---|---|
| 1 |   | LOAN AMOUNT | REPAYMENT AMOUNT FOR TEN THOUSAND YEN |   |
| 2 | MONTHLY REPAYMENT AMOUNT | 21600000 | 60 | 129600 |
| 3 | REPAYMENT AMOUNT FROM EACH BONUS | 8400000 | 500 | 420000 |
| 4 | TOTAL AMOUNT | 30000000 |   |   |

FIG. 24

|   | A | B | C | D |
|---|---|---|---|---|
| 1 |   | LOAN AMOUNT | REPAYMENT AMOUNT FOR TEN THOUSAND YEN |   |
| 2 | MONTHLY REPAYMENT AMOUNT | 22000000 | 60 | 132000 |
| 3 | REPAYMENT AMOUNT FROM EACH BONUS | 8000000 | 500 | 400000 |
| 4 | TOTAL AMOUNT | 30000000 |   |   |

FIG. 25

|   | A | B | C | D |
|---|---|---|---|---|
| 1 | 0 | 0 | | |
|   | 0 | A1xA2 | | |
| 2 | 0 | | | |
|   | 0 | | | |

*Fig. 26*
*( Prior Art )*

|   | A | B | C | D |
|---|---|---|---|---|
| 1 | 5 | 80 | | |
|   | 5 | A1xA2 | | |
| 2 | 16 | | | |
|   | 16 | | | |

*Fig. 27*
*( Prior Art )*

|   | A | B | C | D |
|---|---|---|---|---|
| 1 | 5 | 100 | | |
|   | 5 | 100 | | |
| 2 | 16 | | | |
|   | 16 | | | |

*Fig. 28*
*( Prior Art )*

METHOD OF BIDIRECTIONAL RECALCULATION

This application is a continuation of Ser. No. 07/398,123 filed on Aug. 23, 1989, now abandoned.

FIELD OF THE INVENTION

The present invention relates to a spreadsheet system for processing data displayed on a spreadsheet, and particularly to the apparatus capable of recalculation in both directions.

BACKGROUND ART

Spreadsheet programs capable of constructing tables using a plurality of cells prepared for storing data are known in the art. Calculating procedures for determining ell values may be stored in the cells, while other cell values may be automatically calculated based on cell value changes by the user. Examples of such programs include Multiplan (Trademark) by the MICROSOFT Corp. and Lotus 1-2-3 (Trademark) by Lotus Development Corporation.

These conventional programs, however, have the following disadvantages. In these programs, the calculating procedure of the cell value is expressed by a function formula. Hereinafter, a cell whose value determination procedure is described by a function formula is called a "function value cell", and the cell referred to in the function formula is called a "variable value cell". FIG. 26 shows exemplified definitions of the function, formulas. Each of the cell names is the same as that employed in Lotus 1-2-3. At the upper row of the each cell the cell value displayed on the screen is shown. At the lower row the value defined in the cell or the function formula is shown. In this example, the function formula $$A1*A2$$

is defined for the function value cell B1. In case the value of the variable value cell is changed, the value of the function value cell is automatically recalculated by reevaluating the function formula. For instance, when the value of the variable value cells A1 and A2 are changed to 5 and 16, respectively, as shown in FIG. 27, the value of the function value cell B1 is recalculated and 80 in calculated as the value. However, even if the value of the function value cell is changed, it is impossible to recalculate the value of the variable value cell. For instance, even if the value of the function value cell B1 is changed to 100 as shown in FIG. 28, the values of the variable value cells A1 and A2 are not recalculated. The defined function formula A1*A2 is deleted instead and the value 100 is defined for the cell B1.

In other words, the conventional technique permits only one-way recalculation.

It is to be noted here that although there are patent publications concerning the technology, such as PUPA numbers 61-138369, 61-138370 and 61-138371, they merely disclose the general tabulations and no bidirectional recalculations.

SUMMARY OF THE INVENTION

It is an object of the present invention to provide a spreadsheet system having a recalculation function in both directions.

It is another object of the invention to provide a spreadsheet system which recalculates the value of a function value cell based on the value change of the variable value cell and recalculates the value of one of the variable value cells based on the value change of the function value cell.

These and other objects are achieved in the present invention by producing a calculation model on the basis of the relations of cells in the calculation procedure of the cell value. In the case where at least one change instruction of the cell value is given, the marking on the produced calculation model is performed to determine the recalculation order of the other cell value, the recalculation order is determined using the marks for the recalculation, and then the recalculation is performed.

BRIEF DESCRIPTION OF THE DRAWINGS

FIGS. 7, consisting of (a)–(c), shows the recalculation method dependent upon the order of the relation on which the recalculation is performed.

FIG. 10 illustrates a flow diagram of a method showing the order of cell calculation.

FIG. 20 shows variations in the object cell when different rules are applied.

FIGS. 21 through 25 show working examples of a loan repayment calculation using the invention.

FIGS. 26 through 28 illustrates conventional techniques that permit one-way recalculation.

DETAILED DESCRIPTION

E1. Overview of the System

Figure 1:
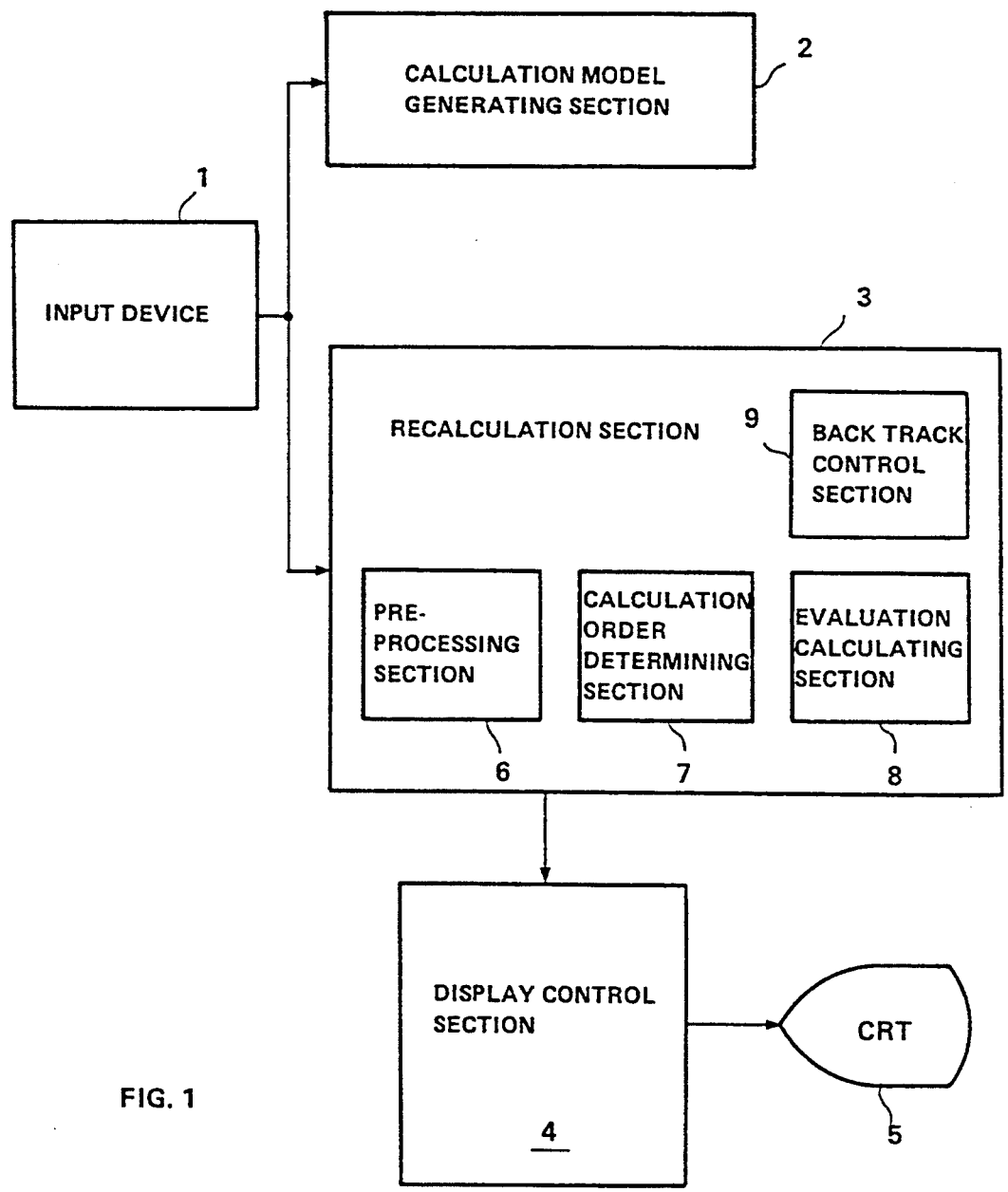
FIG. 1 illustrates a processing system according to one embodiment of the present invention.

FIG. 1 shows a processing system according to one embodiment of the present invention. This processing system comprises an input device 1, a calculation model generation section 2, a recalculation section 3, a display control section 4 and a CRT 5. The information concerning the relation of the cells is inputted through the input device 1 by the user. The calculation model generation section 2 produces a calculation model on the basis of the inputted relation information. The details of the calculation model generation section 2 will be described later. A change instruction of the cell value is inputted through the input device 1 by the user. The recalculation section 3 changes the corresponding cell value in accordance with the inputted change instruction and recalculates the other cell values by using the calculation model. The recalculation generation section comprises a pre-processing section 6, a calculation order determining section 7, an evaluation calculating section 8 and a backtrack control section 9. The recalculation section will also be described in detail later. The result of the recalculation performing section 3 is displayed on the CRT 5 by the display control section 4.

E2. Calculation Model Generation Section 2

The calculation model generation section 2 produces the calculation model which will be described in (2) based on the information concerning the relation of the cells which are inputted by the user and will also be described in (1), thereby enabling the performing the recalculation in both directions.

(1) The information concerning the relations of the cells comprises a relation formula of cell and a propagation constraint cell.

The relation formula is expressed by:

$$y = f(X_1 \ldots X_n)$$

where $Y, X_1, \ldots,$ and $X_n$ are names of cells in which Y is a function value cell and $X_i$ ($1 \leq i \leq n$) is a variable value cell.

The propagation constraint cell is one of the variable value cells and is to be recalculated based on the value change of the function value cell. There, an inverse function for determining the value of the propagation constraint cell should be developed in accordance with the relation of the cells as shown:

$$X_k = f^{-1}(Y, X_1, \ldots, X_{k-1}, X_{k+1}, \ldots, X_n)$$

where $X_k$ is the propagation constraint cell.

(2) The calculation model comprises a relational node representing the relation, a cell node representing the cell, and an arc linked with these nodes. Each of the relational nodes is distinguished from the others by the inherent relation name. The relational node includes the relation formula as the data. Each of the cell nodes is distinguished from the others by the inherent cell name. The cell node includes the cell value as data. The arc is expressed by a pair of nodes consisting of the cell node and the relational node linked by the arc. The arcs are classified into three kinds. The first arc links the cell node representing the function value cell with the relational node and its direction is from the relational node to the cell node. The second arc links the cell node representing the variable value cell with the relational node and its direction is from the relational node to the cell node. The third kind arc links the other cell node with the relational node and is not directional. The information concerning the cell node, the relational node and the arc is controlled, for example, so that their respective information is recorded in a table.

Figure 2:
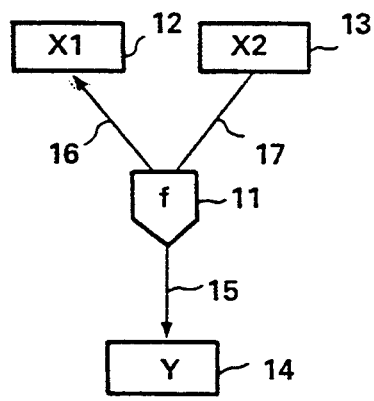
FIG. 2 shows a calculation model of the relation F of the cells Y, X1 and X2.

The calculation model will be explained with reference to the drawing. FIG. 2 shows a calculation model of the relation f of the cells Y, $X_1$ and $X_2$. A pentagon 11 indicates the relational node. Rectangles 12, 13 and 14 indicate the cell nodes. The arc represented by the arrow from the top end of the pentagon is the arc linking the cell node representing the function value cell with the relational node and the direction of the arrow represents the arc direction. In FIG. 2, an arc 15 corresponds to this arc and is linked with the cell node Y (Y is the relation value cell). The arc represented by the arrow from the base of the pentagon links the cell node indicating the propagation constraint cell with the relational node and the direction of the arrow indicates the direction of the arc. In FIG. 2, an arc 16 corresponds to this arc and is linked with the cell node X1 (X1 is the propagation constraint cell). The other arc from the base of the pentagon links the cell node which is not the propagation constraint cell but the variable value cell with the relational node. In FIG. 2, an arc 17 corresponds to this arc and is linked with the cell node $X_2$ ($X_2$ is not the propagation constraint cell, but the variable value cell).

The recalculation on this calculation model is performed in accordance with the following rules.

Figure 3:
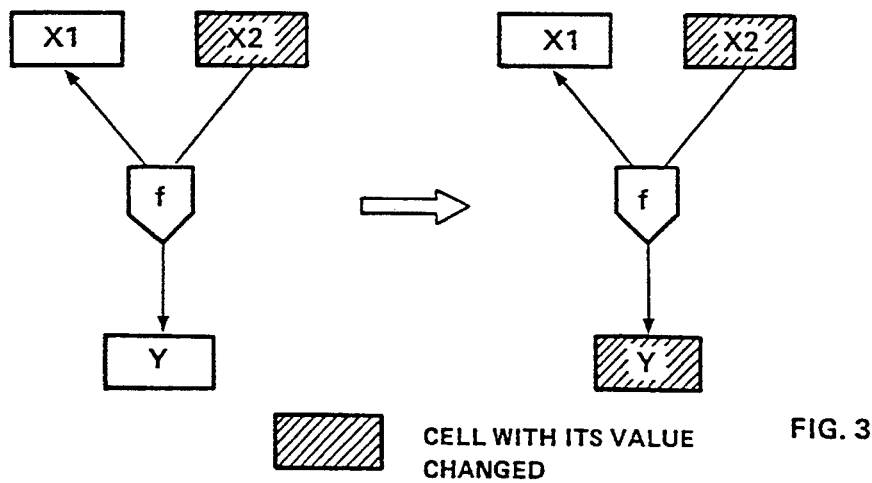
FIGS. 3 and 4 shows examples of the recalculation of the relation F.

First, in case attention is paid to one relation, the value of the function value cell is recalculated when the value of the variable value cell is changed and the value of the function value cell is not changed. FIG. 3 shows an example of the recalculation of the relation f. In this example, since the value of the variable value cell X2 is changed and the value of the function value cell Y is not changed, the value of Y is recalculated.

Figure 4:
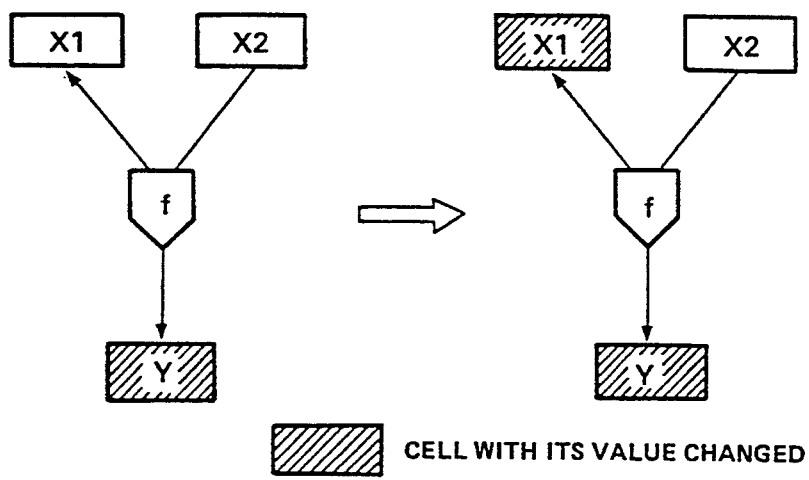

Second, in case attention is paid to one relation, the value of the propagation constraint cell is recalculated when the value of the function value cell is changed and the value of the propagation constraint cell is not changed. FIG. 4 shows an example of the recalculation on the relation f. In this example, since the value of the function value cell Y is changed and the value of the propagation constraint cell X1 is not changed, the value of X1 is recalculated.

E3. Recalculation Section 3

The recalculation performing portion 3 changes, in accordance with the change instruction of the cell value by the user, the corresponding cell value and recalculates the values of the other cells based on the calculation model.

Figure 5:
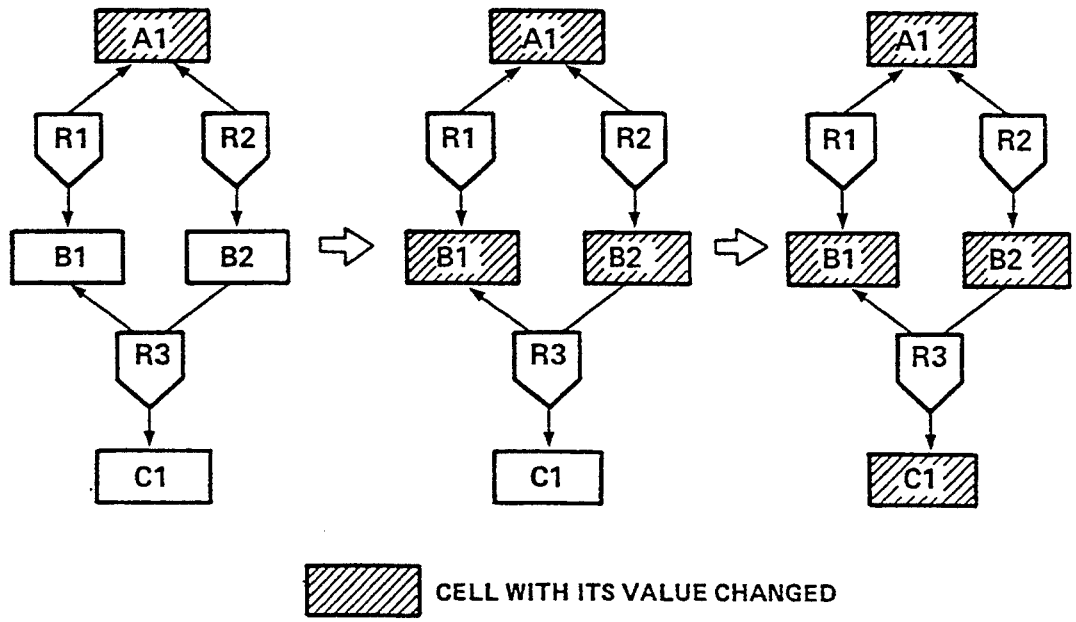
FIG. 5 shows a recalculation followed by a change in the value of a cell.

It is to be noted that the recalculation based on the relation is performed after completion of the recalculations for all cells for which recalculation may be required based on other relations. For instance, when the value of the cell A1 is changed as shown in FIG. 5, after the values of the cells B1 and B2 are recalculated in accordance with the relations R1 and R2, the value of the cell C1 is recalculated in accordance with the relation R3.

Figure 6:
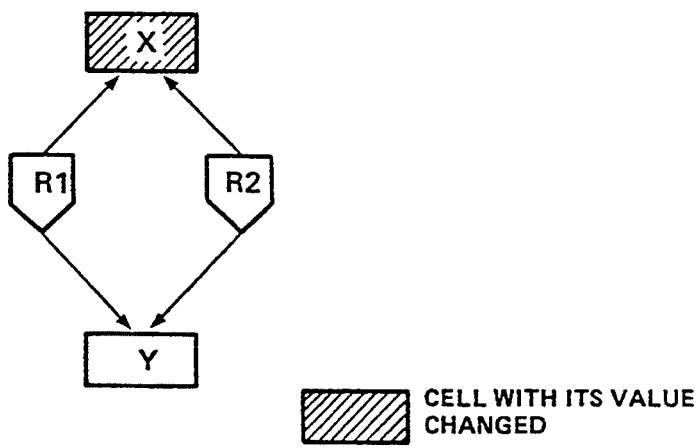
FIG. 6 shows a state produced in a loop in the recalculation procedure.

Furthermore, the recalculation performing portion 3 copes with two problems, due to the possibility of recalculation in both directions, as follows:

The first problem resides in a loop produced in the recalculation procedure. FIG. 6 shows a state of the loop production. Referring to FIG. 6, on performing the recalculation of the relation R1, the value of the function value cell Y on the relation R1 is recalculated since the value of the cell X is changed. As a result, the recalculation rule stated in E2 cannot be used for the recalculation of the relation R2 since both values of the function value cell Y and the propagation constraint cell X have already been changed. In order to cope with such case, the recalculation section determines whether the relation formula is satisfied or not when both values of the function value cell and the propagation constraint cell are changed. When the relation formula is not satisfied, this fact is reported to the user.

The second problem is that the recalculation method varies depending upon the order of the relation on which the recalculation is performed. In FIG. 7, for instance, since the values of the cells A1 and A2 are changed, if the recalculation on the relation R1 is performed first, the value Y of the function value cell Y on the relation R1 is recalculated by using the relation formula of the relation R1 as shown in FIG. 7(b) and, therefore, the value of the propagation constraint cell B2 on the relation R2 is recalculated in accordance with the relation R2. On the other hand, if the recalculation on the relation R2 is performed first, the value of the function value cell Y on the relation R2 is recalculated by using the relation formula of the relation R2 as shown in FIG. 7(c) and the value of the propagation constraint cell B1 on the relation R1 is recalculated in accordance with the relation R1. In order to cope with this case, when the recalculation method varies depending upon the order of the relation on which the recalculation is performed, the recalculation section records each cell value, and selects one relation on which the recalculation should be performed to continue the recalculation. When the backtrack is driven thereafter, the other relations are selected and the recalculation is continued after being returned to the state where each cell value was recorded.

The recalculation section 3 comprises, as shown in FIG. 1, the pre-processing section 6, the calculation order determining section 7, the evaluation calculating section 8 and the backtrack control section 9. On inputting the change instruction of the cell value by the user, the pre-processing section 6 performs the marking on the calculation model 2 to investigate all cells which may possibly be changed during the recalculation procedure. Then, the calculation order determining section 7 determines the recalculation order of the cell value by using the marks attached in the pre-processing section 6 and the evaluation calculating section 8 recalculates the cell value. The backtrack control section 9 records each cell value when the recalculation method varies depending upon the order of the relation on which the recalculation is performed and returns each cell value to the recorded original value when the backtrack is driven. The details of each portion will be described below.

Pre-processing Section 6

The pre-processing section 6 attaches, in response to the input of the change instruction of the cell value by the user, a mark, which will be described below, on the calculation model to investigate all cells which may possibly be changed during the recalculation procedure. There are three kinds of marks, such as M-cell, Input arc and Output arc, as shown in Table 1.

The mark M-cell is used for judging whether the cell value is changed or not. The mark Input arc is used for identifying the cell whose value may possibly be changed due to the reasons other than the recalculation on that relation. The mark of Output arc is used for identifying the cell whose value may possibly be changed due to the recalculation of that relation.

TABLE 1

| Mark Name | Contents of the Mark |
| --- | --- |
| M-cell | attached to the cell node to be the object of the change instruction by the user or to the cell node on which recalculation has been performed. |

TABLE 1-continued

| Mark Name | Contents of the Mark |
| --- | --- |
| Input-arc | attached to the arc linking the relational node with the cell node to be the object of the change instruction by the user or with the cell node linked with the arc having a mark of Output arc on the other relations. The Input arc's direction is from the start point of the cell node to the end point of the relational node. |
| Output arc | attached to the arc linking the cell node to be recalculated with the relational node when the cell node linked with the arc which is marked with Input arc is changed. The Output arc's direction is from the start point of the relational node to the end point of the cell node. |

The pre-processing section 6 first deletes, when the change instruction is inputted by the user, all of the marks M-cell, Input arc and Output arc on the calculation model, changes the value of the cell node to be changed by the user's change instruction to the specified value by the user and marks M-cell on that node. The section 6 also supplies an initializing instruction to the backtrack control section 9 and attaches the marks of Input arc and Output arc to all of the arcs which satisfy the marking condition.

Figures 8, 9:
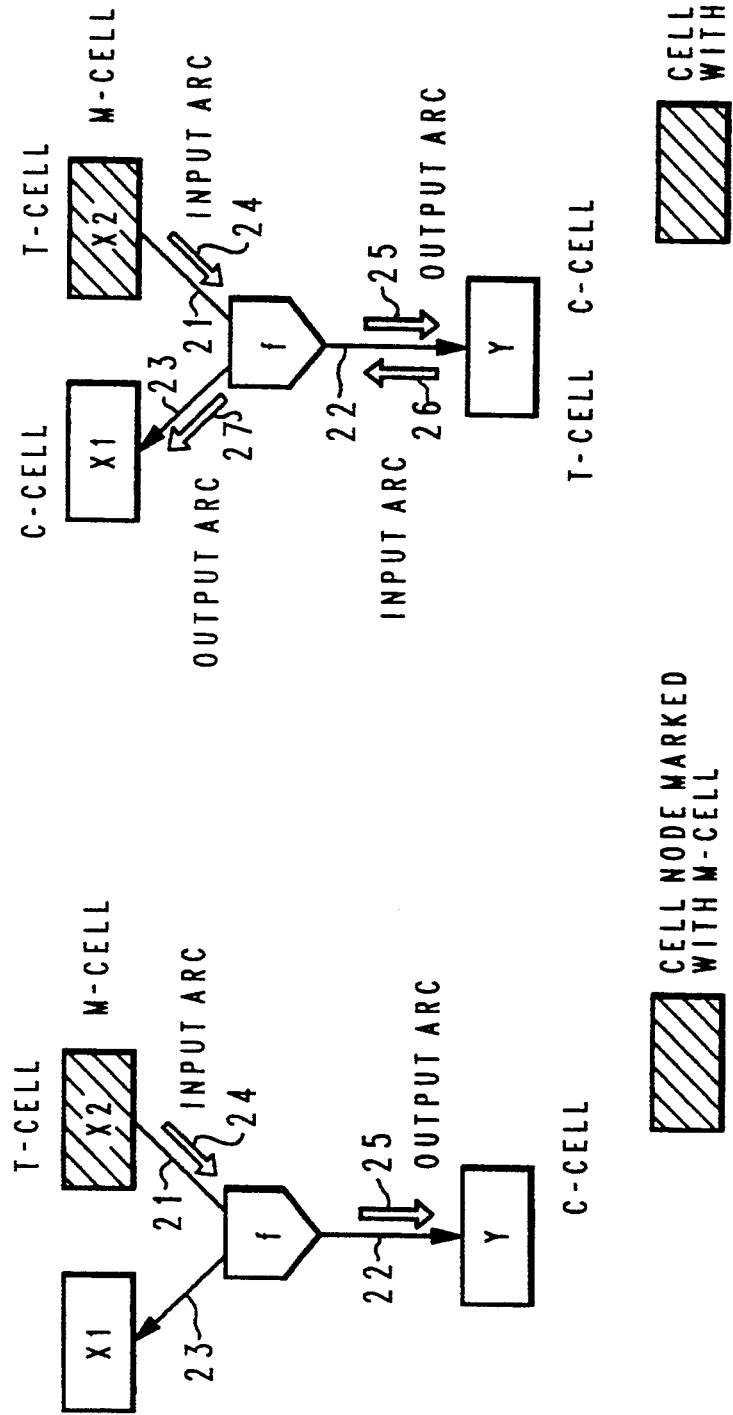
FIGS. 8 and 9 show a marking example for the relation Y=f(X1, X2).

FIG. 8 shows a marking example on the relation Y f(X1, X2) wherein the propagation constraint cell is represented by X1. Here, when the cell X2 receives the users' change instruction, the cell X2 is marked with M-cell. The mark of Input arc 24 is attached to an arc 21 linking the cell node X2 with the relational node f. Now, when the X2 value is changed, an arc 22 linking the relational node f with the cell node Y is marked with Output arc 25 since X2 is the variable value cell and the cell to be recalculated is the function value cell Y.

FIG. 9 shows the marking state where the cell node Y additionally links the arc marked with Output arc on the other relation in the calculation model of FIG. 8. In this case, the arc 22 between the cell node Y and the relational node f is marked with Input arc 26. When the value of Y is changed, an arc 23 between the relational node f and the cell node X1 is marked with Output arc 27 since the cell to be recalculated is the propagation constraint cell X1.

Hereinafter, the cell node of the start point of Input arc is called a "T-cell" on its relation and the cell of the end point of Output arc is called a C-cell on its relation.

Calculation Order Determining Section 7

The calculation order determining section 7 determines the order of the cells to be recalculated by using the mark attached in the pre-processing section 6. The order of the cells to be recalculated is determined by, for instance, a method shown in FIG. 10. In this method, seven rules are used. The respective rules will be detailed below.

Figure 11:
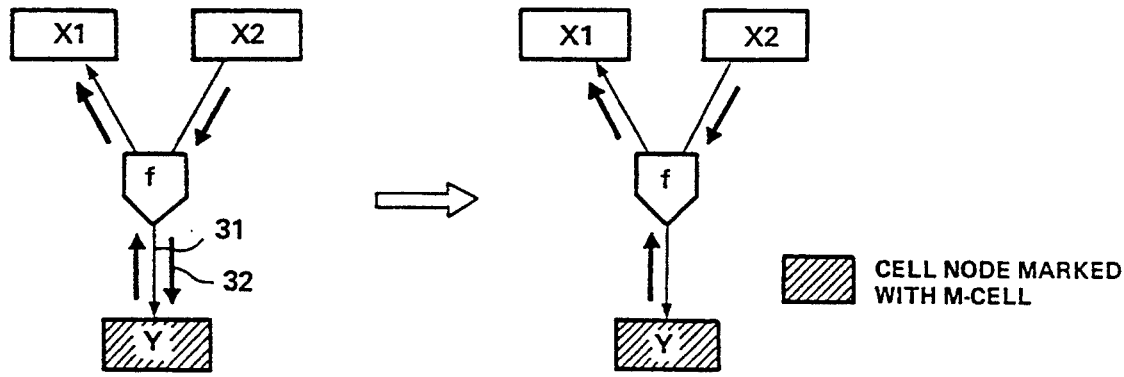
FIGS. 11 through 15 shows performing examples using rules 1–5, respectively.

The condition and action of the rule 1 are shown in Table 2. The cell whose value has been already changed never becomes an object of recalculation and, therefore, the rule 1 is used to delete the mark of Output arc from the arc linking the cell node which is marked with M-cell. FIG. 11 shows a performing example of the rule 1. In this example, the mark of Output arc 32 is deleted from an arc 31 linking the relational node f with the cell node Y since the cell node Y is marked with M-cell.

TABLE 2

(Rule Name)
    Rule 1
(Condition)
    In the case where Output arc is marked on the arc
    linking the cell node marked with M-cell.
(Action)
    The marks of these Output arcs are deleted.

Figure 12:
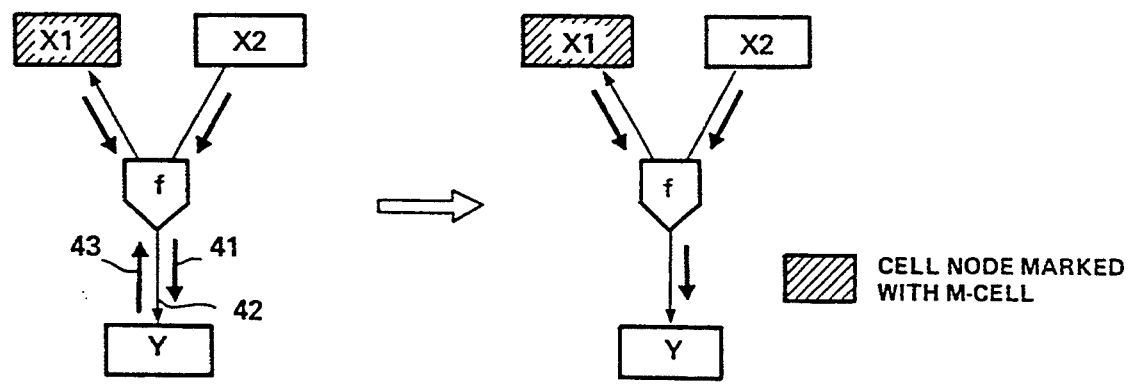

The condition and action of the rule 2 as shown in Table 3. The rule 2 is used to decide, when there is only one cell which may possibly have to be the object of the recalculation, whether or not that cell is to be the recalculation object. FIG. 12 shows a performing example of the rule 2. In this example, since there exists only Output arc 41, and an arc 42 having a mark of Output arc 41 which is marked with Input arc 43, the mark of Input arc 43 is deleted.

TABLE 3

(Rule Name)
    Rule 2
(Condition)
    In case there is an arc marked with both Output
    arc and Input arc in the arcs linking one
    relational node, and the arc marked with Output
    arc is not linked with that relational node.
(Action)
    The mark of Input arc is deleted from the arc
    marked with both Output arc and Input arc.

Figure 13:
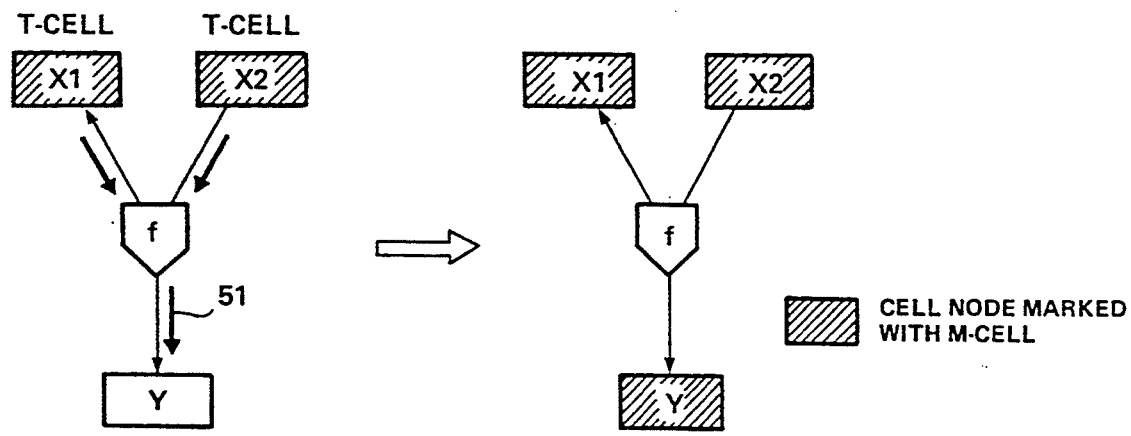

The condition and action of the rule 3 are shown in Table 4. The rule 3 is used to perform, when all of the cells which have the possibility of being changed by the other relation have been already changed, the recalculation on the relation. FIG. 13 shows a performing example according to rule 3. In this example, since T-cells are X1 and X2 and are marked with M-cell, the value of cell node Y to which Output arc 51 directs is recalculated. Then, the Y is marked with M-cell and the marks attached to all arcs are deleted.

TABLE 4

(Rule Name)
    Rule 3
(Condition)
    In case all of T-cells are marked with M-cell on
    one relation, and the arc marked with Output arc
    is linked with its relational node.
(Action)
    An instruction to perform value recalculation, by
    using the relation formula of the relational node,
    of the cell node to which Output arc directs is
    issued to the evaluation calculating section 8,
    all of the marks (Input arc and Output arc) on the
    arc linked with its relational node are deleted,
    and the cell node whose value has been
    recalculated is marked with M-cell.

Figure 14:
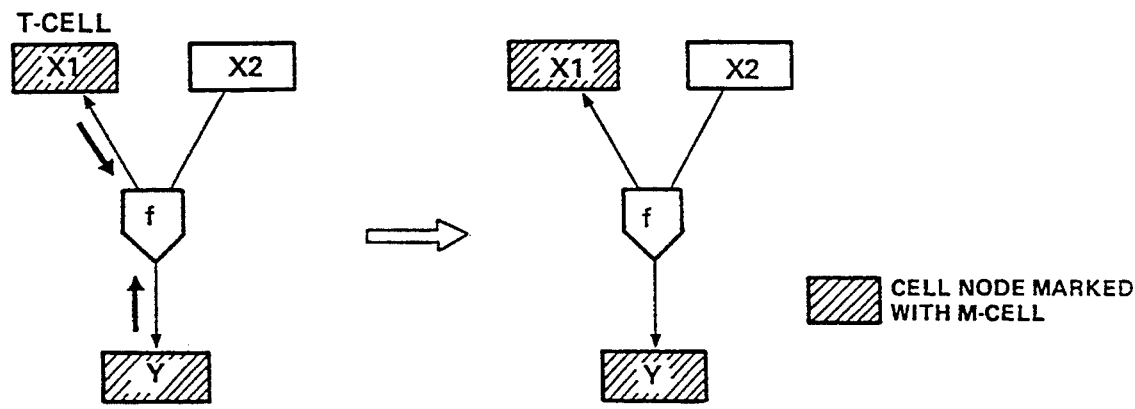

The condition and action of the rule 4 are shown in Table 5. The rule 4 is used when all of cells having the possibility of being changed by the other relation have already been changed and there is no cell to be the object of the recalculation. FIG. 14 shows a performing example according to the rule 4. In this example, T-cells are Y and X1 and are marked with M-cell. Since there is no arc marked with Output arc but an arc marked with Input arc in the arcs linking the relational node, the rule 4 is applied and the check is performed. All marks on the arcs are deleted.

TABLE 5

(Rule Name)

TABLE 5-continued

Rule 4
(Condition)
    In case all of T-cells on one relation are marked
    with M-cell, there is no arc marked with Output
    arc in the arcs linked with its relational node,
    and there is an arc marked with Input arc in the
    arcs linked with its relational node.
(Action)
    The evaluation calculating section 8 is instructed
    to determine whether its relation is satisfied or
    not and all of the marks (Input arc) on the arc
    linked with its relational node are deleted.

Figure 15:
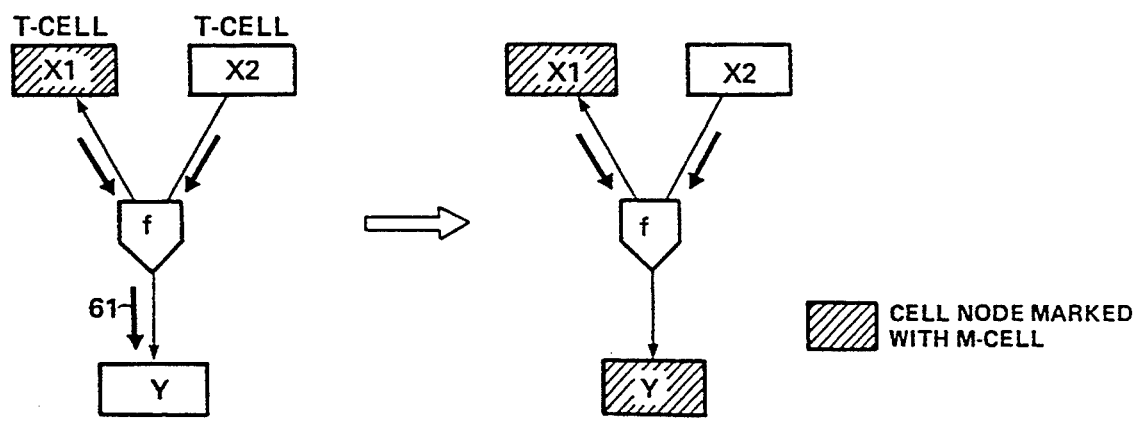

The condition and action of the rule 5 are shown in Table 6. The rule 5 is used to cope with the loop. FIG. 15 shows a performing example according to the rule 5. In this example, since there is only one Output arc 61 as the arc having a mark of Output arc linked with the relational node f and the cell node X1 is marked with M-cell, the value of the cell node Y is recalculated and the mark of Output arc 61 is deleted.

Figure 16:
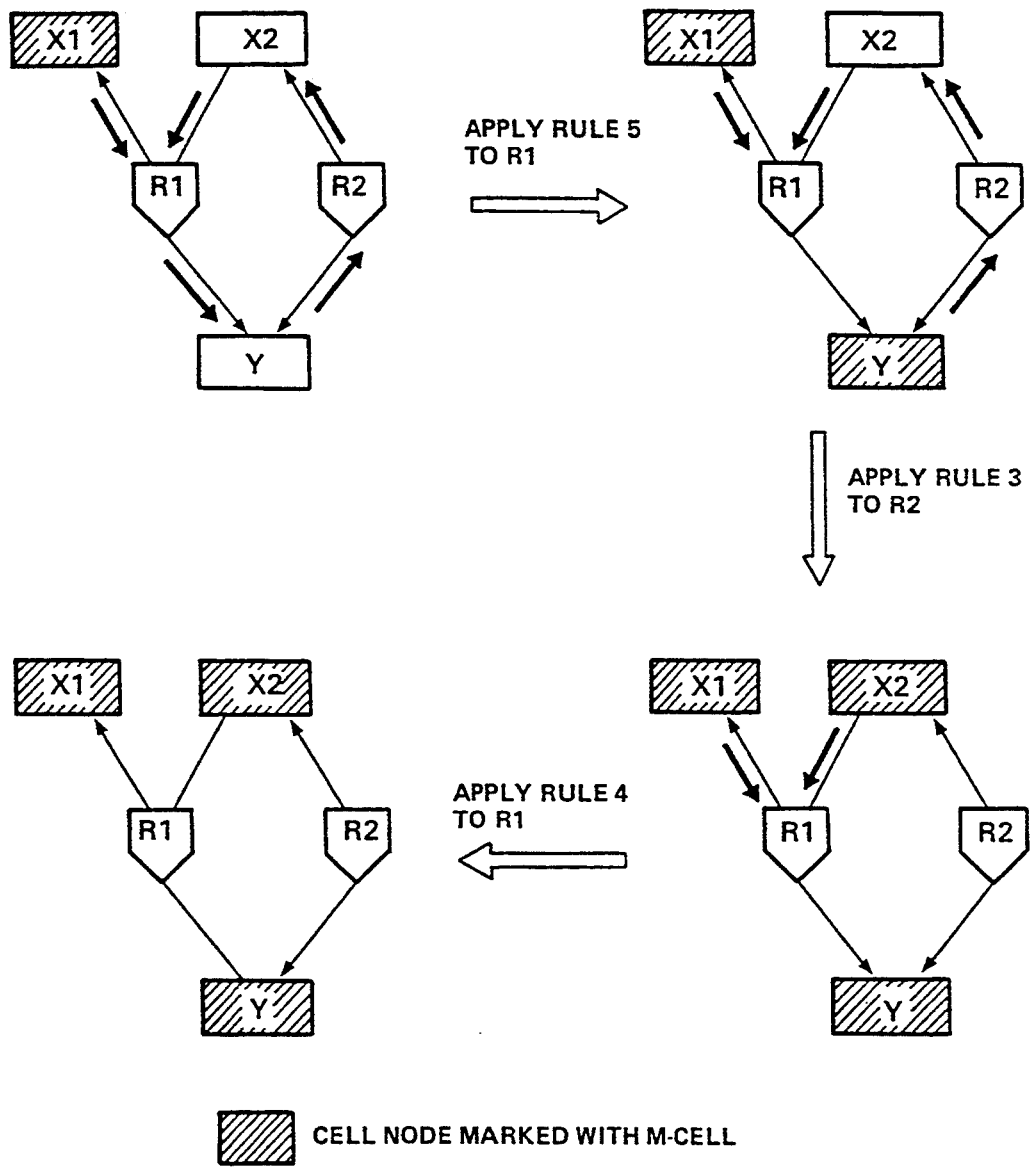
FIG. 16 shows an example for resolving a loop when rule 5 is used.

FIG. 16 shows an example to cope with the loop by the rule 5. In this example, the loop is produced and, therefore, the value of the cell node X2 cannot be recalculated unless the value of the cell node Y is recalculated. In this case, by applying the rule 5 to the relation R1, the Y value is recalculated and the rule 3 becomes applicable to the relation R2. Then, the X2 value is recalculated. Subsequently, the rule 4 is applied to the relation R1 to determine whether R1 is satisfied or not.

TABLE 6

(Rule Name)
    Rule 5
(Condition)
    In case there is only one arc marked with Output
    arc in the arcs linked with one relational arc,
    and there is a cell node marked with M-cell in the
    T-cells on its relation.
(Action)
    The evaluation calculating section 8 is instructed
    to recalculate the value of the cell node to which
    Output arc directs by using the relation formula
    of its relational node, its cell node is marked
    with M-cell, and the mark of its Output arc is
    deleted.

Figure 17:
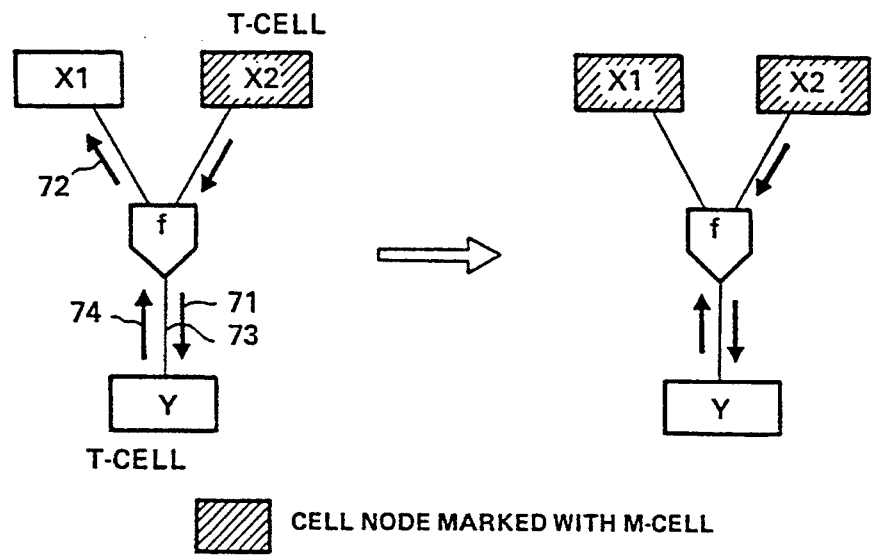
FIG. 17 shows a performing example using rule 6.

The condition and action of the rule 6 are shown in Table 7. The rule 6 is used when the cell to be recalculated varies depending upon the order of the relation to which the rule is applied. FIG. 17 shows a performing example according to the rule 6. In this example, there are two Output arcs 71 and 72 marked on the arc linked with the relational node f. An arc 73 is marked with Input arc 74 and a cell node X2 is marked with M-cell. Here, if the backtrack control section 9 permits the rule 6 to be applied to the relation f, the cell node X1 is marked with M-cell and the Output arc 72 is deleted.

Figure 18A:
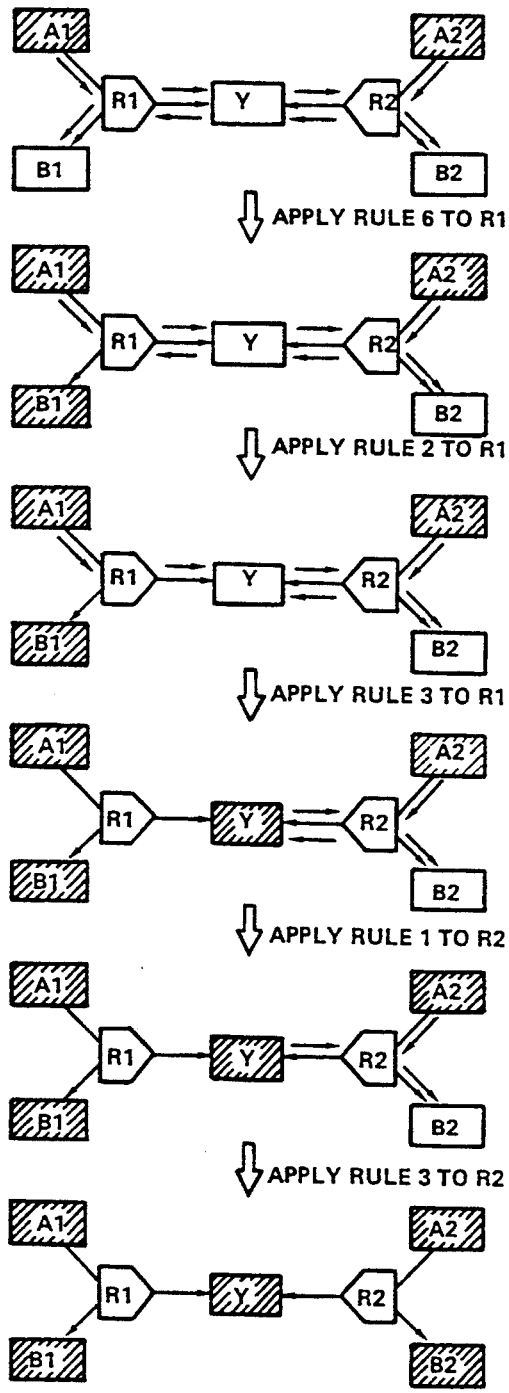
FIGS. 18(a) and (b) show a recalculation of cell values where the recalculation of the cell value must be forcedly performed.

In case the cell to be recalculated varies depending upon the order of the relation to which the rule is applied, further recalculation cannot be performed unless the recalculation of the cell value on one of the relations is forcedly performed. In the case of FIG. 18, for instance, the recalculation cannot be continued unless the recalculation on the relation R1 or R2 is forcedly performed. Here, by applying the rule 6 to R1 as shown in FIG. 18(a), the rule may be applied as shown in the drawing thereafter.

Figure 18B:
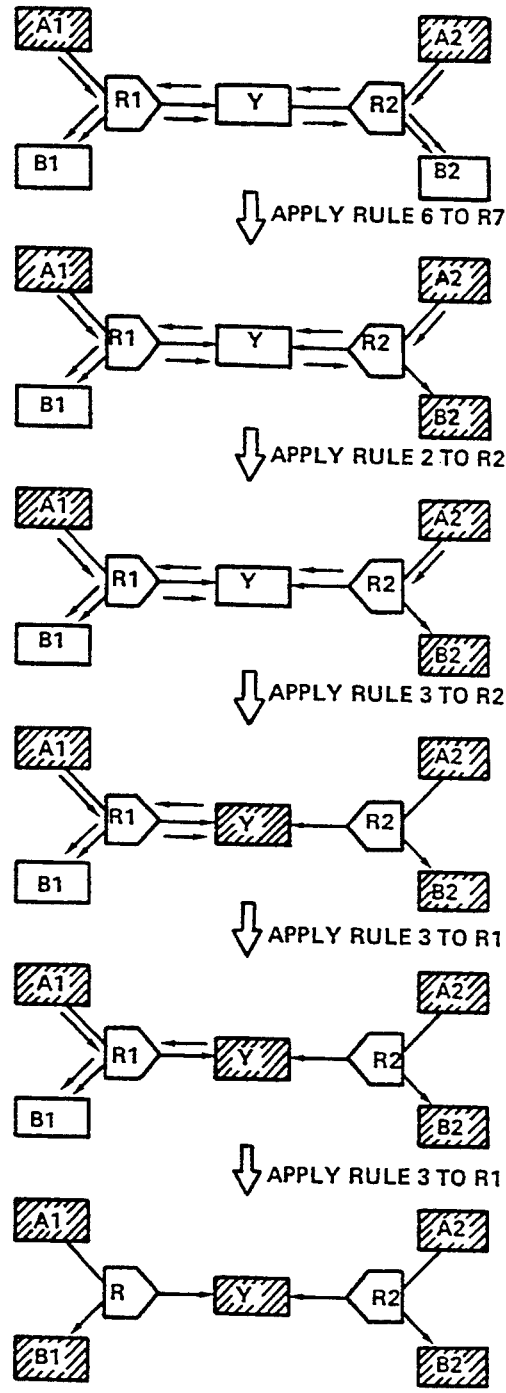

Consequently, the value of Y is recalculated from R1 and the value of B2 is recalculated from R2. Then, at the time when the state is returned to that before the rule 6 is applied to R1 by backtracking, the value of Y is recalculated from R2 by applying the rule 6 to R2 as shown in FIG. 18(b) and the value of B1 is recalculated from R1.

TABLE 7

(Rule Name)
  Rule 6
(Condition)
  In case there are two arcs linked with one relational node and marked with Output arc, and one of which is marked with Input arc, there is a cell node marked with M-cell in T-cells on its relation, and the backtrack control section 9 permits the application of the rule 6 to its relation.
(Action)
  The backtrack control section 9 is informed that the rule 6 has been applied to its relation, the cell node linked with the arc having a mark of only Output arc is marked with M-cell, and the mark of Output arc is deleted from its arc.

Figure 19:
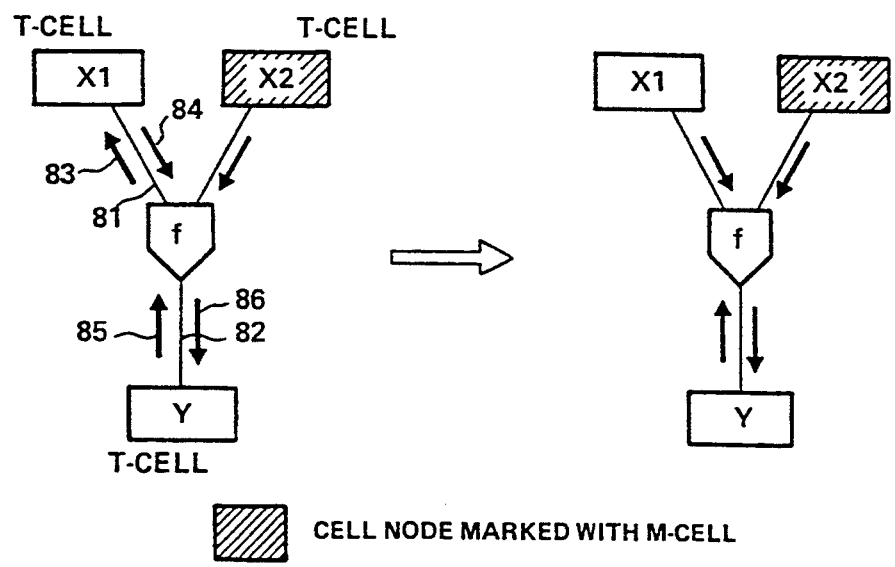
FIG. 19 shows a performing example using rule 7.

The condition and action of the rule 7 are shown in Table 8. The rule 7 is applied when the object cell to be recalculated varies depending upon the order of the relation to which the rule is applied and the loop is produced. FIG. 19 shows an example of the performance of the rule 7. In this example, both of the arcs 81 and 82 linked with the relational node f are marked with Output arc and Input arc, and the cell node X2 is marked with M-cell. When the backtrack control section 9 permits the application of the rule 7 to the relation f, Output arc 83 is deleted.

In FIG. 20, the object cell to be recalculated varies depending upon the order of the relation to which the rule is applied and the loop is produced. In this case, by applying the rule 7 to the relation R1, as shown in FIG. 20, the rule may be applied thereafter. Consequently, the value of Y is recalculated from R1 and the value of A2 is recalculated from R2. Then, the check of whether or not R1 is satisfied is performed. When the state is returned to that before the rule 7 is applied to R1 through the backtrack, by applying the rule 7 to R2 the values of Y and A2 are recalculated from R2 and R2, respectively, and the check of whether or not R2 is satisfied is performed. The examples thereof are omitted in FIG. 20.

TABLE 8

(Rule Name)
  Rule 7
(Condition)
  In case there are two arcs linking with one relational node and marked with both Output arc and Input arc, there is a cell node marked with M-cell among T-cells on its relation, and the backtrack control section permits to the rule 7 to be applied to the relation.
(Action)
  The backtrack control section is informed that the rule 7 has been applied to its relation, and the mark of Output arc is deleted from the arc linking the cell-node representing the propagation constraint cell with the relational node.

Evaluation Calculating Section 8

The evaluation calculating section 8 evaluates the recalculation of the cell value and determines whether or not the relation is satisfied in response to the recalculation instruction and the evaluation instruction from the calculation order determining section 7.

The recalculation of the cell value is carried out as follows. When the cell to be recalculated is the functional cell, the right side of the relation formula is evaluated and its value is set as the value of the function value cell. When the cell to be recalculated is the propagation constraint cell, an inverse function for determining the value of the propagation constraint cell is produced from the relation formula, its inverse function is evaluated and thus the determined value is set as the value of the propagation constraint cell.

The determination of on whether or not the relation is satisfied is performed by comparing the evaluation value of the right side of the relation formula with the value of the function value cell. If the two values are not the same, the user is warned thereof.

Backtrack Control Portion 9

The phenomenon in which the cell to be recalculated is varied depending upon the order of the relation to be performed is caused when there is a plurality of relations to which the rules 6 and 7 are applicable. Therefore, the backtrack control section 9 should record, at the time when these rules are applied to the relation, the state of the calculation model such as the value of each cell and the marking state, and should return to the state in which the state has been recorded in response to the driving of the backtrack.

Moreover, the backtrack control section 9 should control the system so that these rules are never applied to the same relation more than once on the same calculation model state.

The backtrack control section 9 has the following functions.

The first function is to record, when the beginning of the performance of the rules 6 and 7 has been reported, the calculation model state thereat for the backtracking and the record of which rule is applied to which relation at the calculation model state (this record is called an "application record of the rule at the calculation model state").

The second function is to judge whether the rule 6 may be applied to a given relation. It investigates the application record of the rule at the state of the calculation model thereat, and permits the rule 6 to be applied to the relation if there has been no application of the rule 6 to the relation. The application is not permitted in other cases. This function is used to inhibit the application of the rule 6 more than once to the same relation at the same calculation model state.

The third function is to judge whether the rule 7 may be applied to a given relation. It investigates the application record of the rule at the calculation model state thereat, and permits to apply the rule 7, if there has been no application of the rule 7 to the relation and there has been no application of the rule 6 to any relation at the calculation model state, to the relation. The application of the rule 7 to the relation is not permitted in other cases. This function is used for two purposes. One purpose is to inhibit the application of the rule 7 to one relation more than once at the same calculation model state. Another purpose is to inhibit the application of the rule 7 when there is the application record of the rule 6 at the calculation model state because the rule 6 has a higher priority than that of the rule 7. A more detailed explanation is as follows:

First it is assumed that there are N relations to which the rule 6 is applicable at the calculation model state and a relation to which the rule 7 is applicable. Then, the rule 6 is first applied in consideration of the priority. Since there are N relations to which the rule 6 is applicable, the rule 7 becomes applicable after performing the backtracking N times. Here, if the rule 7 is applied, although the rule 6 was applicable at the calculation model state the rule 7 having a lower priority becomes being applied. Therefore, the application of the rule 7 should be inhibited.

The fourth function is to perform the backtrack. The backtrack control section 9 executes the following processes in response to the instruction of the backtrack:

(1) The actual calculation model state is returned to the state of the latest calculation model recorded and the process (2) is performed. The backtracking is completed if there is no record of the calculation model state.

(2) The recalculation is performed if there is an applicable rule. If there is no applicable rule and the state record of the calculation model utilized in the process (1), all of the application records of the rules at the calculation model state thereat are deleted. Then, the process (1) is performed.

The fifth function is an initializing function to delete all of the state records of calculation models and the application records of the rules.

Figure 29:
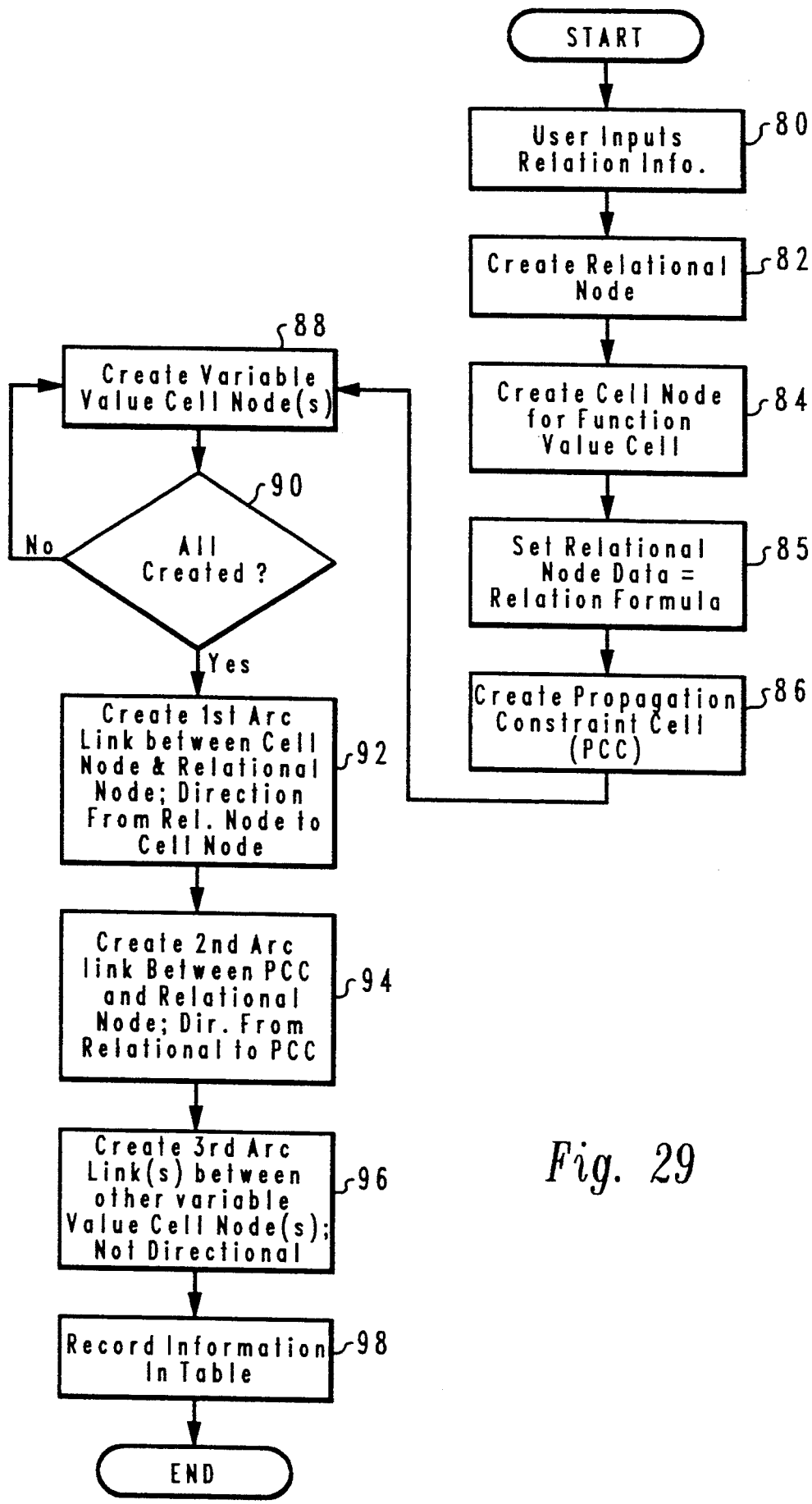
FIGS. 29–33 are flow diagrams illustrating the operation of the invention for forward and reverse calculations.

Turning now to FIG. 29, creation of a calculation model is described which is invoked when a user inputs relation information (80). At block (82), a relational node is created. This is followed by creation of a cell node (block 84) for the function value cell. At block 85, the procedure sets the relational node data equal to the relation formula. A propagation constraint cell (block 86) is created along with the necessary variable value cells (block 88). A plurality of variable value cells may be accommodated by block 90 which checks to see if all the cells have been created. At block (92), a first arc link is created between the cell node and relational node with a direction from relational node to cell node. The second arc link is created (block 94) between the propagation constraint cell and relational node with a direction from the relational node to the propagation constraint cell. At block 96, a third arc is created linking other variable value cell(s) with the relational node which are not directional. The information for the calculation model is then stored in a table as shown in block 98.

Figure 30:
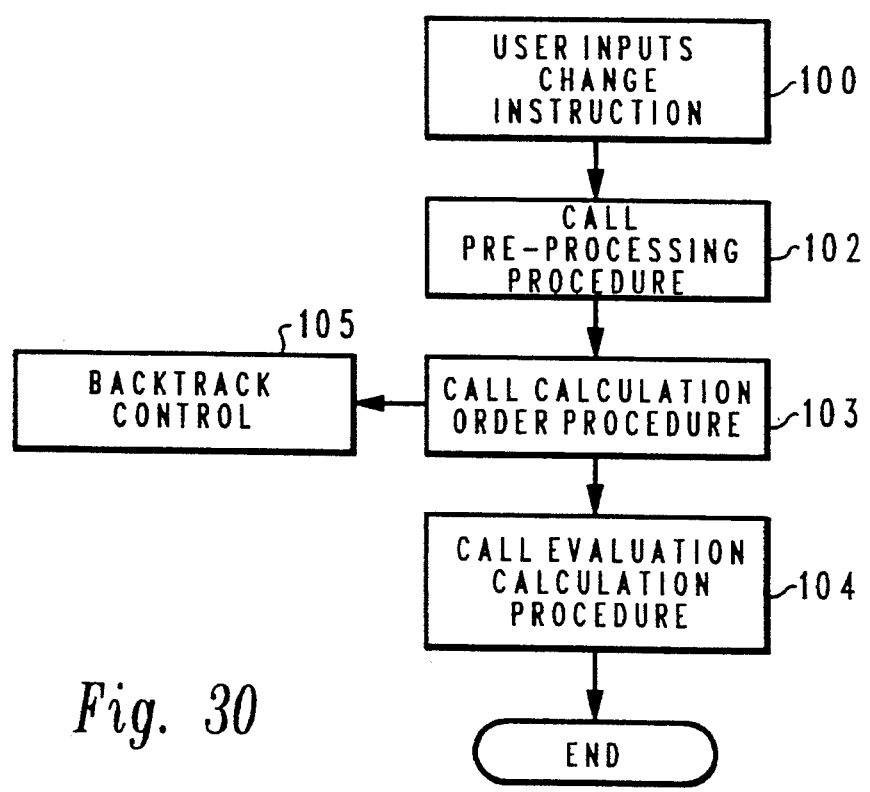

Turning to FIG. 30, the general flow for each procedure in the recalculation section of the invention is described. A user enters/inputs a change (100) for a cell in the spreadsheet. This calls the pre-processing procedure (102) which marks the calculation model. When marking is completed, the calculation order procedure (103) is called which determines the recalculation order of cells using the marks placed by the pre-processing procedure. The Evaluation calculation procedure (104) is called to recalculation cell values after the input change. Finally, backtrack control (105) is called from the calculation order procedure when cell information needs recording as a result of order variation.

Figure 31:
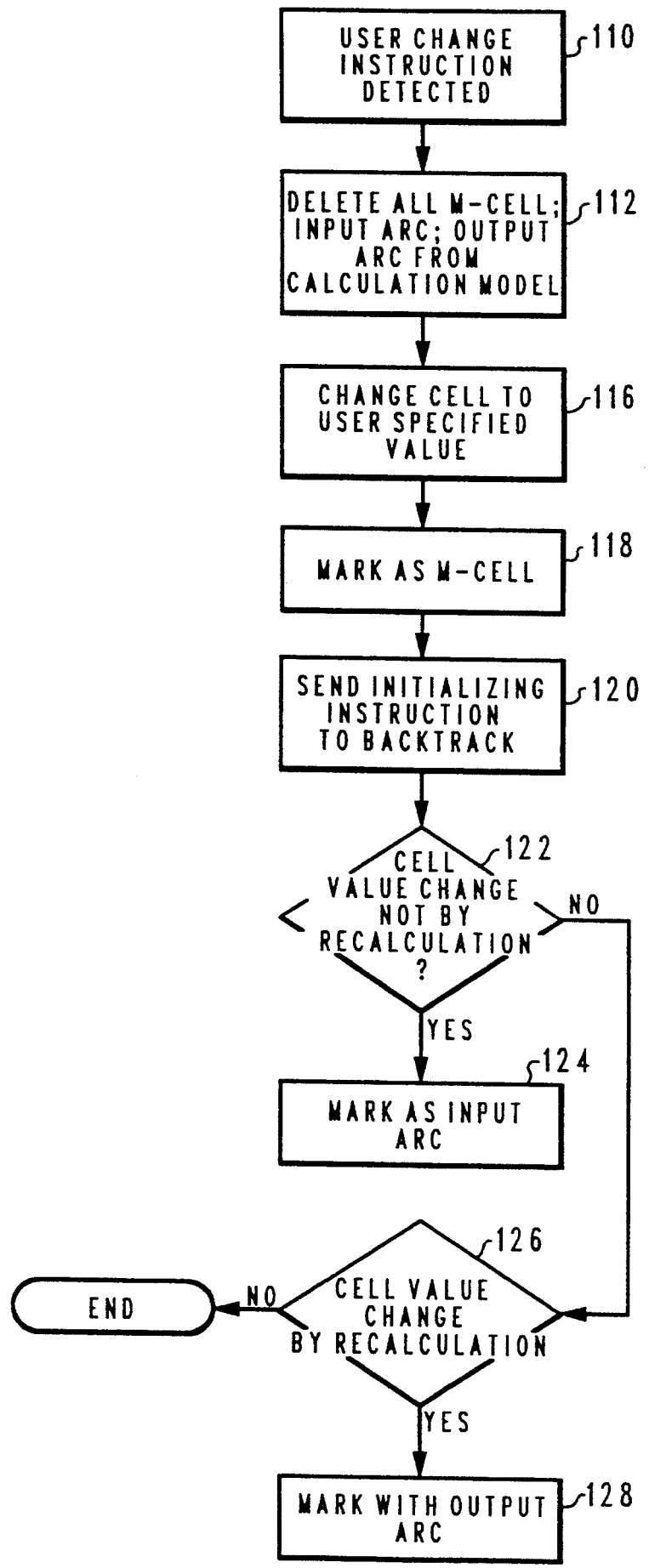

Turning now to FIG. 31, the steps for the pre-processing procedure which is used to mark the calculation model are shown. At block 110, a user change instruction is detected. This causes the procedure (block 112) to delete all M-cell, Input Arc and Output Arc markings from the calculation model. At block 116, the cell is changed to the user specified value and the cell on the calculation model is (block 118) marked as M-cell. At block 120, the procedure sends an initializing instruction to the backtrack logic. Each of the remaining cells on the calculation model are visited and marked. At block 122, if a cell value change is not caused by recalculation, it is marked with an Input-arc (block 124). If cell values changes are caused by recalculation, at blocks 126 and 128, they are marked with Output-Arc to complete marking the calculation model.

Figure 32:
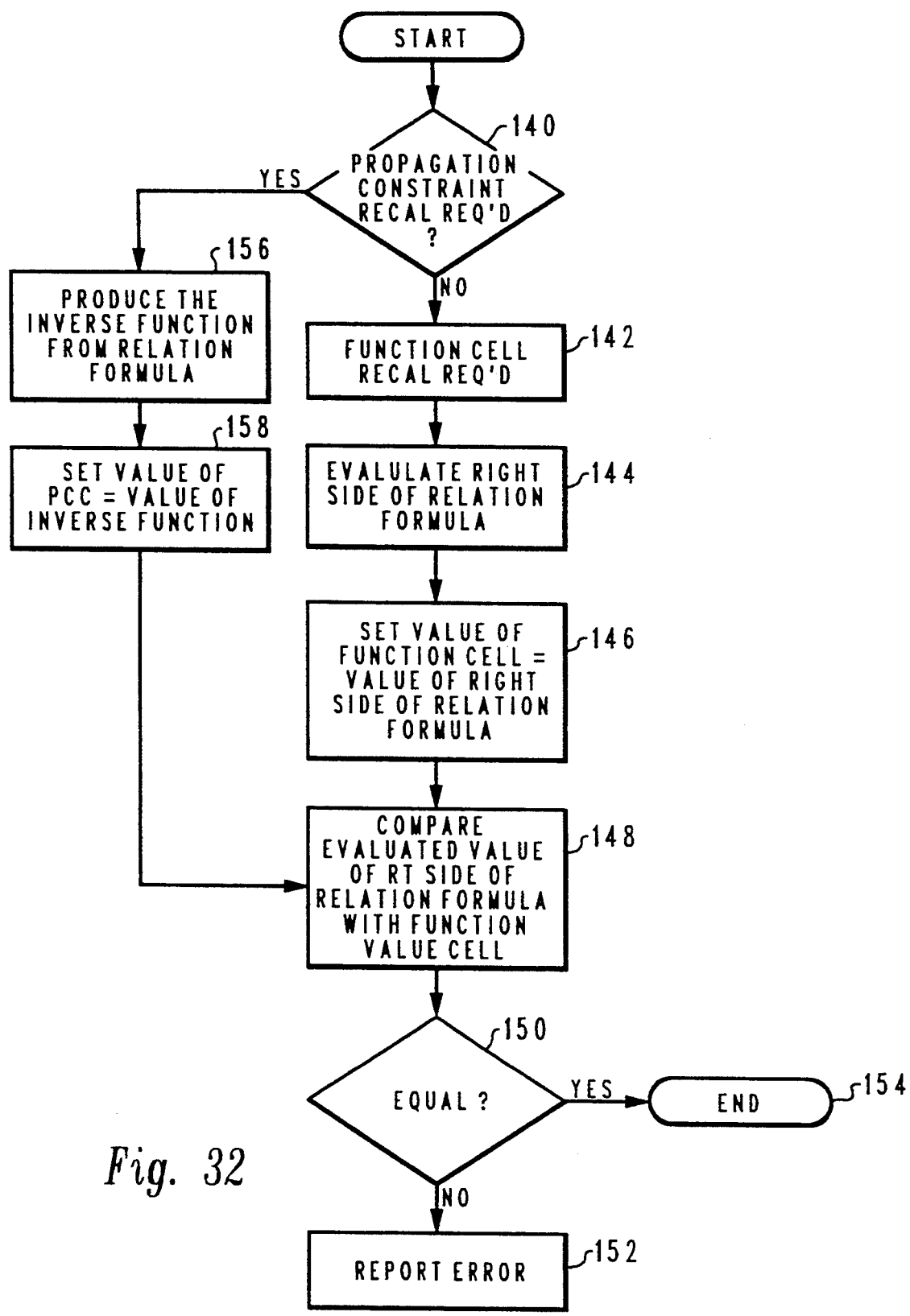

Turning to FIG. 32, the evaluation calculation procedure which is used to recalculate cell values is shown. At block 140, if propagation constraint cell recalculation is required, at block 156 the procedure produces the inverse function from the relation formula. At block 158, the cell value for the propagation constraint cell is set to the value of the inverse function. Returning to block 140, if propagation constraint cell calculation is not required, at block 142, the procedure checks for function cell recalculation. At block 144, the procedure evaluates the right side of the relation formula. At block 146, the procedure sets the value of the function value cell to equal the value of the right side of the relation formula. The procedure then determines whether or not the relation is satisfied in block 148 by comparing the evaluated value of the right side of the relation formula with the value stored in the function value cell. If the values are equal (block 150), the relation is satisfied and the procedure ends at block 154. Else, an error is reported at block 152.

Figure 33:
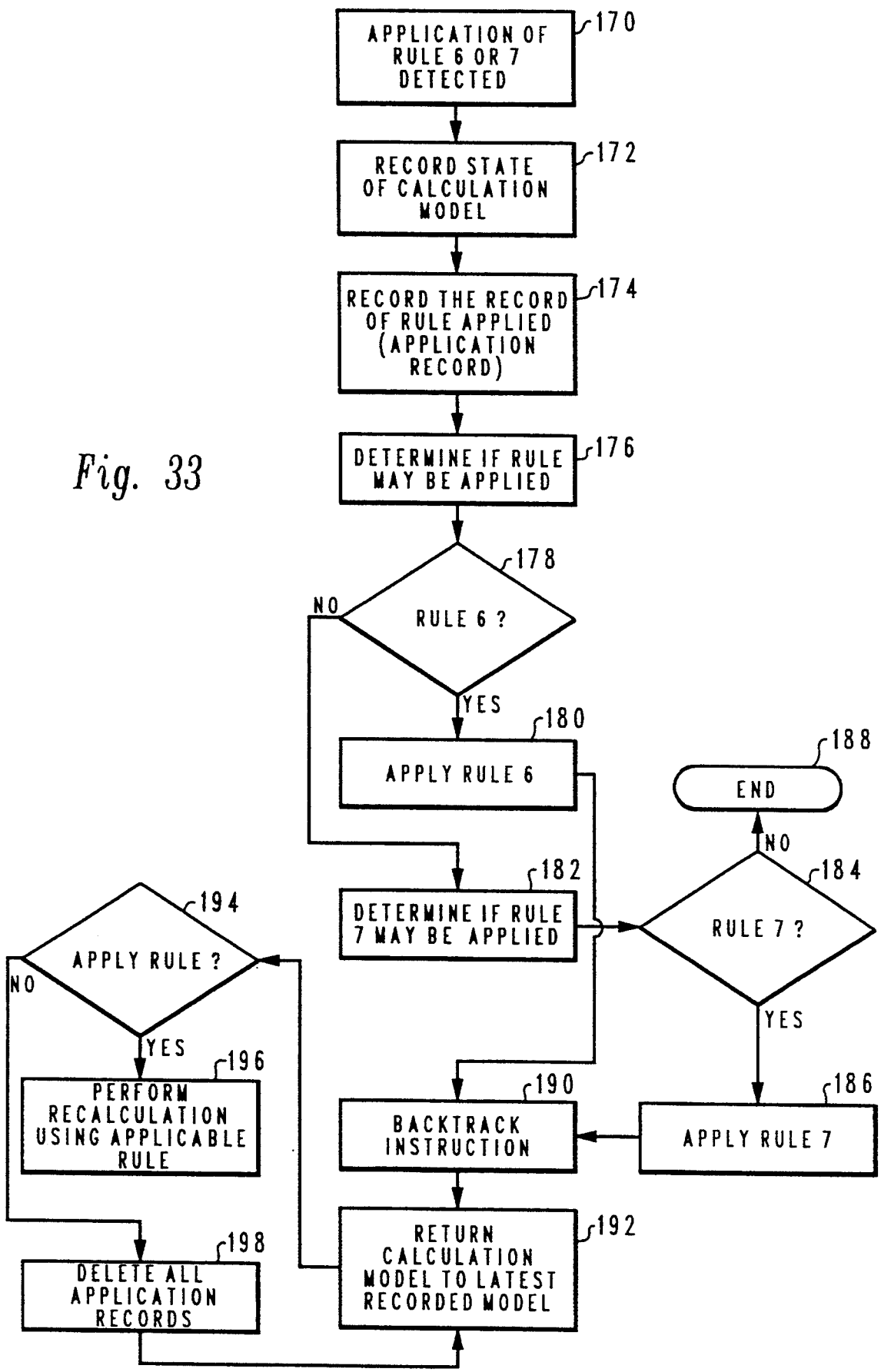

Turning now to FIG. 33, the backtrack procedure which is initiated (block 170) by application of rules 6 and 7 is shown. The backtrack procedure records the state of the calculation model at block 172 as well as the rules applied which are stored in the (block 174) application record. At blocks 176 and 178, the procedure determines if rule 6 may be applied. If rule 6 can be applied, at block 180 the procedure allows application of the rule. If rule 6 cannot be applied, the procedure determines at block 182 if rule 7 may be applied. At blocks 184 and 186, if rule 7 can be applied, application of the rule is permitted. Control of the procedure is then transferred to block 190 where the backtrack function is performed. The procedure returns the calculation model to the (block 192) state of the latest calculation model recorded. If the procedure determines at block 194 that rule 6 or 7 can be applied, the procedure performs the recalculation using the applicable rule. Returning to block 194, if the rules cannot be applied, the backtrack causes the deletion of all the application records at block 198, and control is returned to block 192 where the backtrack is again attempted.

E4. Working Example of the Embodiment

The following is a working example of the spreadsheet using the example of the loan repay calculation according to the present invention.

When making the loan repayment schedule, the method allocating the amounts of the monthly repayments and the repayments by bonus must be considered. This may be easily coped with by the recalculation function in both directions according to the present invention. In FIG. 21, a cell B2 represents the loan amount for monthly repayment; a cell B3 represents the loan amount for bonus repayment; and a cell B4, the total amount of the loan. Cells C2 and C3 are the repayment amounts each time for a loan of ten thousand yen. A cell D2 is a monthly repayment amount, and D3 is a repayment from each bonus. Furthermore, three relations are defined among these cells as shown in FIG. 21.

It is to be assumed here that thirty million yen is necessary for the loan. On inputting that value to the cell B4 as shown in FIG. 22, the value of the cell B2 is first recalculated in accordance with the relation (1), then the value of the cell D2 is recalculated in accordance with the relation (2). As a result, it is understood that one hundred and eighty thousand yen repayment each month is enough.

Now, in order to limit the monthly repayment amount to a maximum of one hundred and twenty thousand yen, an input of 120,000 to the cell D2 is enough. Consequently, as shown in FIG. 23, the value of the cell B2 is first recalculated in accordance with the relation (2), the value of the cell B3 is then recalculated in accordance with the relation (1), and finally the value of the cell D3 is recalculated in accordance with the relation (3). It is understood that a payment of five hundred thousand yen from every bonus is enough in this case.

However, if it is impossible to repay more than four hundred twenty thousand yen from each bonus, an input of 420,000 to the cell D3 is enough. As a result, as shown in FIG. 24, the cell B3 is first recalculated in accordance with the relation (3), the cell B2 is then recalculated in accordance with the relation (1), and finally the cell D2 is recalculated in accordance with the relation (2). It is understandable that the monthly repayment of one hundred twenty nine thousand six hundred yen is enough.

Furthermore, if there is a limitation that the loan amount must be a multiple of one million yen and therefore the loan amount for the bonus is set at eight million yen, an input of 8,000,000 to the cell B3 is enough. Consequently, as shown in FIG. 25, the cell B2 is first recalculated in accordance with the relation (1), the cell D3 is recalculated in accordance with the relation (3) and the cell D2 is then recalculated in accordance with the relation (2). It is now understood that a monthly repayment of one hundred and thirty two thousand yen and a repayment of four hundred thousand yen from each bonus are enough.

While the invention has been particularly shown and described with reference to a preferred embodiment, it will be understood by those skilled in the art that various changes in form and detail may be made therein without departing from the spirit and scope of the invention.

What is claimed is:

1. A spreadsheet system having a recalculation function in both a forward and reverse direction comprising:
   means for establishing a calculation model in said spreadsheet system having at least one relational node corresponding to an inputted relation and a plurality of cell nodes including a function value cell node, a variable value cell node, and a propagation constraint cell node connected to said relational node by a plurality of arcs;
   means for inputting by a user a first change instruction for said variable value cell node;
   means for marking said calculation model in response to said first change instruction based on a series of predetermined rules describing a recalculating order of said function value cell node, variable value cell node and propagation constraint cell node;
   a first means for automatically recalculating a value for said function value cell node based on said inputted relation at said relational node in said forward direction in response to said first change instruction based on the markings on said calculation model placed thereon by said marking means;
   means for inputting by a user a second change instruction for said function value cell node; means for marking said calculation model in response to said second change instruction for said function value cell node based on said predetermined rules; and
   a second means for automatically recalculating a new value for said propagation constraint cell node in said reverse direction using an inverse function of said inputted relation in response to said second change instruction and said markings on said calculation model.

2. A spreadsheet system as recited in claim 1 wherein said second means for automatically recalculating a new value include preprocessing means for detecting a loop production resulting from forward and reverse recalculation of said function value cell node and said propagation constraint cell node by determining if said inputted relation is satisfied for said first change instruction and said second change instruction according to a series of predetermined rules and reporting the status to a user.

3. A spreadsheet system as recited in claim 1 wherein said second means for automatically recalculating a new value include preprocessing means for placing said markings on said calculation model for a plurality of paths that can be changed by forward and reverse recalculation.

4. A spreadsheet system as recited in claim 1 wherein said means for automatically recalculating a new value include means for determining an order for recalculation based on the markings on said calculation model.

5. A method, implemented in a computer, of providing a recalculation function in both direction for a spreadsheet in a data processing system comprising:
   creating a calculation model on the basis of the relations of a plurality of variable value cells including a propagation constraint cell described by a relation formula in said computer;
   inputting a first change instruction by a user for at least one of said variable value cells;
   marking said calculation model in response to said change instruction based on a series of predetermined rules describing a recalculating order of said variable value cells and function value cell in said computer;
   performing said recalculation function based on the marking of said calculation model for said function value cell in a first direction in said computer;
   inputting a second change instruction by said user for said function value cell;
   marking said calculation model in response to said second change instruction for said function value cell based on said predetermined rules; and
   automatically recalculating in said computer a new value for said propagation constraint cell based on the marking on said calculation model and inverse function of said relation formula.

* * * * *